United States Patent
Lawrence et al.

(10) Patent No.: US 11,466,802 B2
(45) Date of Patent: Oct. 11, 2022

(54) SUPPORT RING FOR TUBULAR PRESS CONNECTIONS AND FITTINGS

(71) Applicant: NIBCO INC., Elkhart, IN (US)

(72) Inventors: Benjamin L. Lawrence, Elkhart, IN (US); David A. Bobo, Granger, IN (US); Christopher W. Mason, Granger, IN (US); Robert B. Kelsey, Granger, IN (US)

(73) Assignee: NIBCO INC., Elkhart, IN (US)

( * ) Notice: Subject to any disclaimer, the term of this patent is extended or adjusted under 35 U.S.C. 154(b) by 312 days.

(21) Appl. No.: 16/381,640

(22) Filed: Apr. 11, 2019

(65) Prior Publication Data

US 2019/0331264 A1 Oct. 31, 2019

Related U.S. Application Data (60) Provisional application No. 62/662,416, filed on Apr. 25, 2018.

(51) Int. Cl.
*F16L 19/065* (2006.01)
*F16L 19/07* (2006.01)

(52) U.S. Cl.
CPC .......... *F16L 19/0653* (2013.01); *F16L 19/07* (2013.01)

(58) Field of Classification Search
CPC ..... F16L 19/065; F16L 19/0653; F16L 19/07; F16L 21/007; F16L 37/088; E21B 17/105
See application file for complete search history.

(56) References Cited

U.S. PATENT DOCUMENTS

| | | | | |
|---|---|---|---|---|
| 2,458,874 | A * | 1/1949 | Parker | F16L 37/0925 285/95 |
| 3,339,949 | A * | 9/1967 | Szohatzky | F16L 21/007 285/342 |
| 4,606,559 | A * | 8/1986 | Rammelsberg | F16L 21/08 285/39 |
| 5,683,120 | A * | 11/1997 | Brock | F16L 37/0926 285/148.21 |
| 6,340,181 | B1 * | 1/2002 | Amatsutsu | F16L 5/00 285/321 |
| 6,427,309 | B1 * | 8/2002 | Viegener | F16L 13/142 285/379 |
| 6,805,385 | B2 | 10/2004 | Viegener | |
| 7,434,847 | B2 * | 10/2008 | Densel | F16L 37/0925 285/322 |
| 7,954,861 | B2 | 6/2011 | Swift et al. | |
| 8,585,100 | B2 | 11/2013 | Stults et al. | |
| 2004/0012201 | A1 * | 1/2004 | Bartholoma | F16L 37/088 285/39 |
| 2010/0133808 | A1 | 6/2010 | Castiglioni et al. | |

(Continued)

FOREIGN PATENT DOCUMENTS

WO   WO-9703314 A1 *   1/1997   .......... F16L 37/0915

*Primary Examiner* — Zachary T Dragicevich
*Assistant Examiner* — Alexander T Rufrano
(74) *Attorney, Agent, or Firm* — Price Heneveld LLP (57) ABSTRACT

A support ring for a tubular connection is provided that comprises a body comprising a first end and a second end. A circumferential ring lip extends from the first end of the body and positioned perpendicular to the body. A protrusion is positioned on the body between the first end and the second end. The protrusion comprises a top surface and a bottom surface.

9 Claims, 10 Drawing Sheets

(56) References Cited

U.S. PATENT DOCUMENTS

| | | | |
|---|---|---|---|
| 2011/0204624 A1* | 8/2011 | Lawrence | F16L 13/142 |
| | | | 285/345 |
| 2014/0021719 A1 | 1/2014 | Salehi-Bakhtiari et al. | |
| 2014/0300107 A1 | 10/2014 | Altenrath | |
| 2017/0234464 A1 | 8/2017 | Lawrence et al. | |
| 2018/0313167 A1* | 11/2018 | Randle | E21B 17/105 |

\* cited by examiner

SUPPORT RING FOR TUBULAR PRESS CONNECTIONS AND FITTINGS

CROSS-REFERENCE TO RELATED APPLICATIONS

This patent application claims priority under 35 U.S.C. § 119(e) to U.S. Provisional Patent Application No. 62/662,416, entitled "SUPPORT RING FOR TUBULAR PRESS CONNECTIONS AND FITTINGS," filed Apr. 25, 2018, the entire disclosure of which is incorporated herein by reference.

FIELD

The present disclosure generally relates to tubular connections, and more particularly, to a support ring configured for press fittings.

BACKGROUND

Over the years, the plumbing industry has witnessed a remarkable increase in the use of mechanical joinery systems as alternatives to traditional threaded connections (e.g., as-manufactured fittings with threaded ends joined by threading) and thermal connections (e.g., connections made by brazing, soldering and/or welding). Further, within the general family of mechanical joinery, 'press' joint connections, as understood by those in the field of this disclosure, are finding use in or are being considered for application.

'Press' mechanical joinery includes interlocking devices such as sleeves that aid in affixing mating tubular members. The purpose of these interlocking devices is to mechanically grip the inserted tube, increasing joint slip resistance. However, when 'press' mechanical joinery is employed in actual use, uneven stress associated with the application of the press and/or hoop stress associated with service may cause the joinery to fail, even when a conventional sleeve is holding the tube of the joinery in place.

Accordingly, there is a need for interlocking devices configured for mechanical joinery, including connection sockets of tubular connections (e.g., piping connections) and piping components (e.g., valve assemblies), that provide additional support to prevent the fracture of the socket caused by assembly and application-driven stresses (e.g., hoop stress).

SUMMARY OF THE DISCLOSURE

According to an aspect of the present disclosure, a support ring for a tubular connection is provided that comprises a body comprising a first end and a second end; a circumferential ring lip extending from the first end of the body and positioned perpendicular to the body; and a protrusion positioned on the body between the first end and the second end, wherein the protrusion comprises a top surface and a bottom surface.

According to another aspect of the present disclosure, a support ring for a tubular connection is provided that comprises a body, a protrusion axially positioned on the body, and a circumferential ring lip. The body comprises an outer surface, a first end, and a second end, and the protrusion comprises a top surface and a bottom surface and extending circumferentially from the body. The circumferential ring lip extends from the first end of the body.

According to a further aspect of the present disclosure, a tubular connection is provided that comprises a connection socket comprising an outer lip and a socket cup; a pipe comprising a pipe end in contact with the socket cup; and a support ring positioned about the pipe and operably coupled to the connection socket. The support ring comprises a body having an outer surface, a first end, and a second end; a ring lip extending from the first end of the body and positioned flush with the outer lip of the connection socket; and a protrusion having a top surface and a bottom surface, wherein the protrusion is positioned on the body of the support ring.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone;

A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other. In some embodiments, "substantially" may denote values within about 10 degrees of each other, such as within about 5 degrees of each other, or within about 2 degrees of each other.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1A-5, the 'press' and 'push' mechanical joinery of the disclosure, including piping components, connection sockets, support rings, and tubular connections, offers a unique support structure to prevent fracture during use in an application environment. Without such a support structure, pressure may build up within the piping system that acts upon both the body and the connection of the press component. Under high pressure, the hoop stress that develops can promote expansion and, in some examples, fracturing of the socket. In addition to the hoop stress, an axial force may be exerted by the pressure developed along the plane of the pipe when the tubular connection is in service. The axial force acts against the piping component surfaces, promoting slippage. Particularly under high-pressure exposure, the axial force may cause slippage between the piping surfaces and the press connection surfaces. This disclosure applies to connection sockets and piping components that contain at least one support ring. The support ring can prevent fractures and slippage in the joint caused by pressure in the pipe and/or fractures caused by the assembly forces of the 'press' and 'push' joinery. Advantageously, the support ring may provide increased stability against the hoop stress and may provide uniform support around the full circumference of the socket against the uneven distribution of force developed when the tubular connection is pressed during assembly. Also advantageously, the threading or circumferential protrusion located on the support ring may provide an additional grip to hold the piping in place in the socket, preventing slippage during application or assembly of the connection.

Figure 1A:
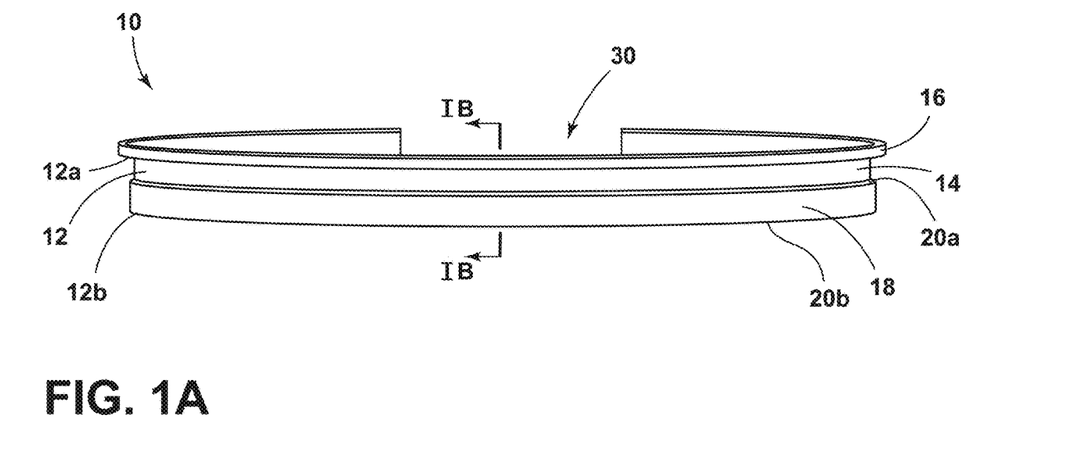
FIG. 1A is a perspective view of a support ring, according to one example.
Figure 1B:
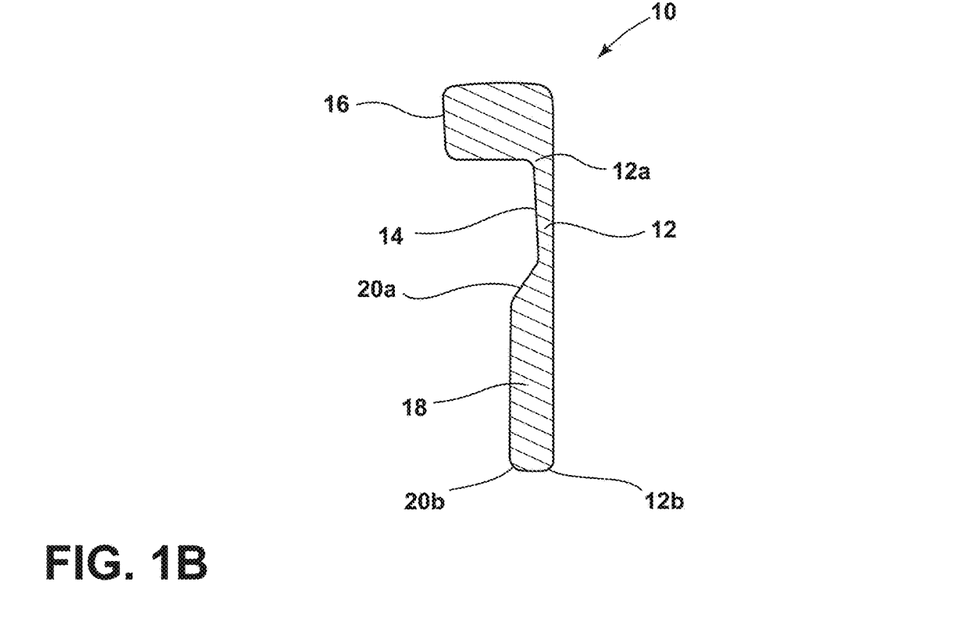
FIG. 1B is a cross-sectional view of the support ring taken along line IB-IB of FIG. 1A.
Figure 1C:
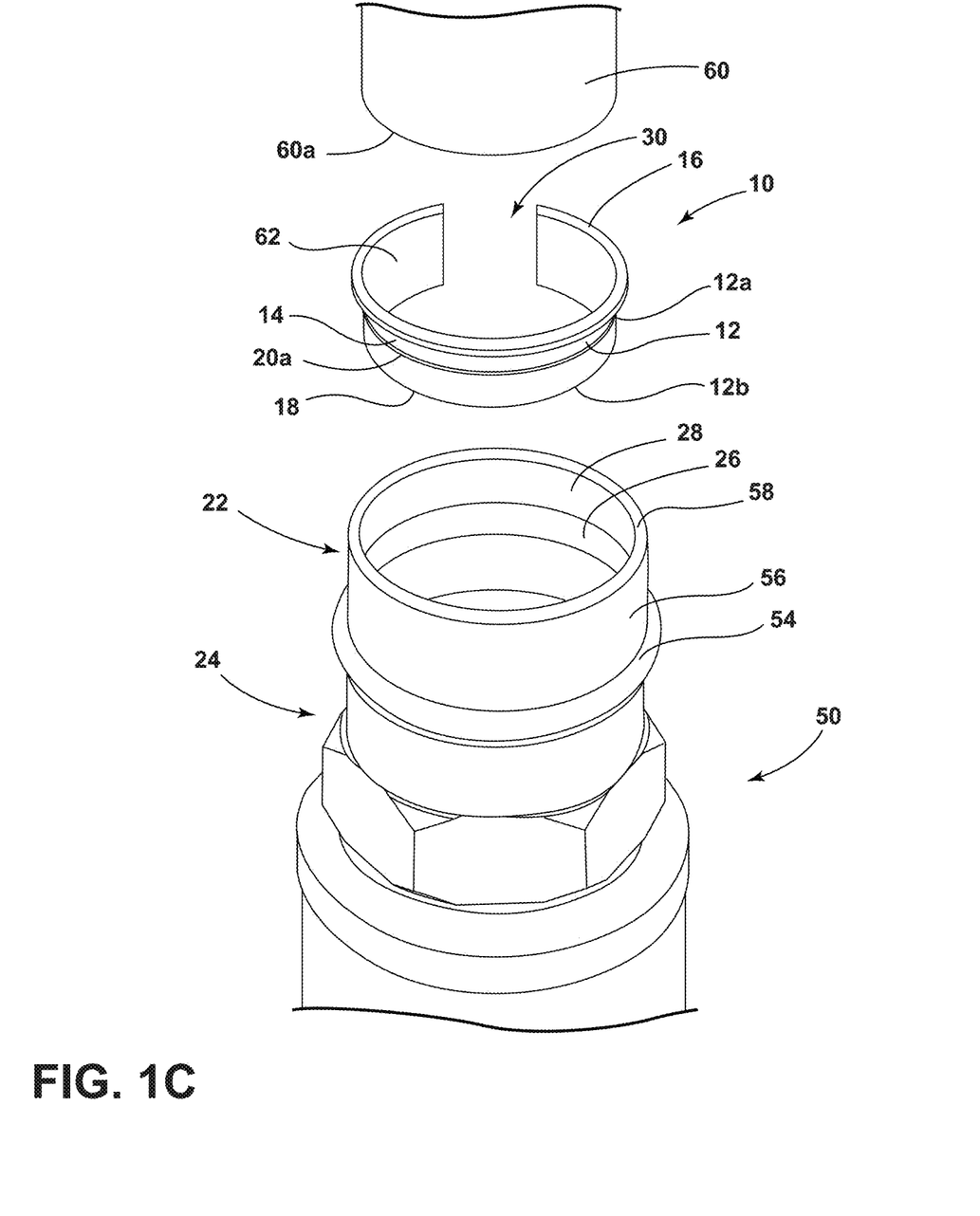
FIG. 1C is an exploded view of a connection socket and piping including the support ring of FIG. 1A.
Figure 2A:
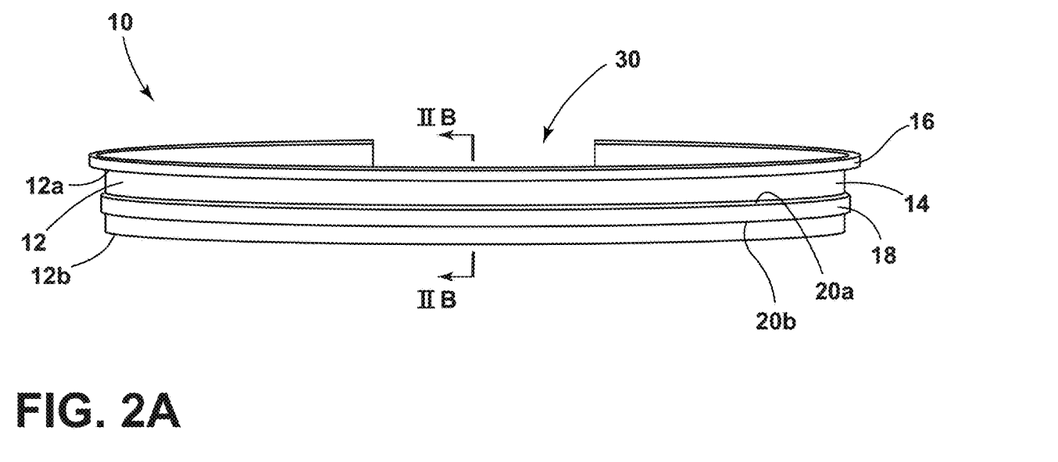
FIG. 2A is a perspective view of a support ring, according to another example.
Figure 2B:
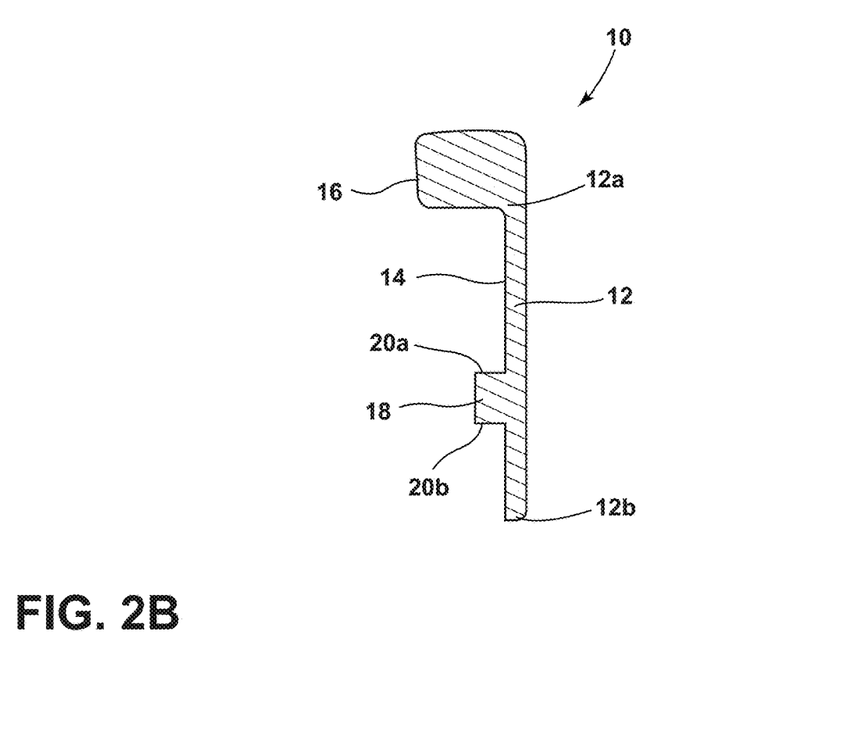
FIG. 2B is a cross-sectional view of the support ring taken along line IIB-IIB of FIG. 2A.
Figure 2C:
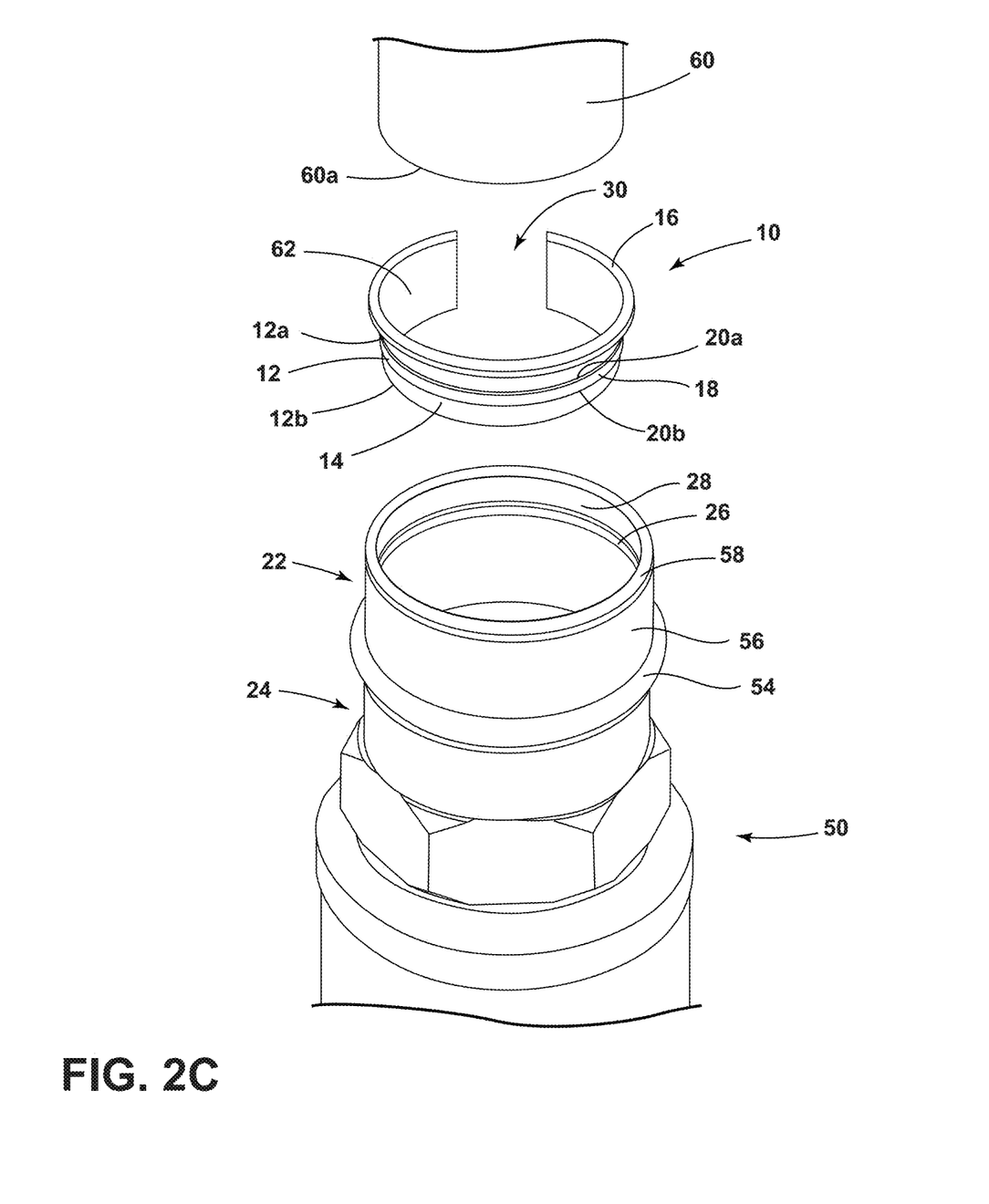
FIG. 2C is an exploded view of a connection socket and piping including the support ring of FIG. 2A.

Referring now to FIGS. 1A-1C and 2A-2C, a support ring 10 is depicted that can be employed in a tubular connection 50 (see FIGS. 1C and 2C). The support ring 10 includes a body 12 having a first end 12*a*, a second end 12*b*, and an outer surface 14. A circumferential ring lip 16 extends outwardly from the first end 12*a* of the body 12. The outer surface 14 of the support ring 10 includes a protrusion 18 extending around the circumference of the body 12. The protrusion 18 may be positioned on any part of the outer surface 14 of the body 12 located between the first end 12*a* and the second end 12*b*. For example, as shown in FIGS. 1A-1C, the protrusion 18 may extend axially from the second end 12*b* to beyond a midpoint of the body 12 of the support ring 10 and may extend circumferentially about the body 12 of the support ring 10. In another example, as shown in FIGS. 2A-2C, the protrusion 18 may be spaced from the first end 12*a* and the second end 12*b* of the body 12 of the support ring 10. Other examples include positioning the protrusion 18 at the second end 12*b* of the body 12 of the support ring 10, positioning the protrusion 18 to extend an entire axial length of the body 12 of the support ring 10, or positioning the protrusion 18 between the first end 12*a* and the second end 12*b*. The protrusion 18 may also have a top surface 20*a* and bottom surface 20*b*. As shown in FIGS. 1A-1C, one or both of the top surface 20*a* and the bottom surface 20*b* may be positioned at a predetermined angle relative to the body 12 of the support ring 10. Alternatively, as shown in FIGS. 2A-2C one or both of the top surface 20*a* and the bottom surface 20*b* may extend perpendicularly to the body 12 of the support ring 10. It is also contemplated that the protrusion 18 may have any cross-section including, for example, a semi-circular, a trapezoidal, pentagonal, rectangular, triangular, or square shaped cross-section.

Referring to FIGS. 1C and 2C, the protrusion 18 is of a predetermined axial height and circumferential thickness, where the axial height extends from the top surface 20*a* as the protrusion 18 to the bottom surface 20*b* of the protrusion 18 and the circumferential thickness extends outward from the outer surface 14 of the body 12. The predetermined axial height may be any axial height permitted by a distance between the first end 12*a* of the body 12 and the second end 12*b* of the body 12. The distance between the first end 12*a* of the body 12 and the second end 12*b* of the body 12 is limited by the design of a connection socket 24. The distance cannot be greater than the distance from an outer lip 58 of a socket cup 22 of the connection socket 24 to a sealing recess 54 of the connection socket 24. The circumferential thickness may be any circumferential thickness permitted by the thickness of an outer wall 56 of the socket cup 22. The protrusion 18 is configured to be received by a channel 26 defined by an inner surface 28 of the socket cup 22. It will be understood that the cross-sectional shape of the channel 26 can be determined by the shape of the cross-section of the protrusion 18. The support ring 10 may be formed of a metal alloy, such as, for example, steel. The alloy is selected based on strength to provide a thin (e.g., low in thickness) support ring 10 that provides reinforcement of the tubular connection 50 to prevent fracture from hoop stress, as discussed in more detail below.

The support ring 10, as shown in FIGS. 1A-1C and 2A-2C, is a split support ring 10 that comprises a compressible split 30. The compressible split 30 is defined by the body 12 as extending from the ring lip 16 and the first end 12a of the body 12 to the second end 12b of the body 12. Essentially, the split 30 is the space between the end surfaces (not shown) defined by the first and second ends 12a, 12b.

When the support ring 10 is received by the socket cup 22 (see FIGS. 1C and 2C), the support ring 10 is compressed circumferentially, causing a closing of the split 30. The support ring 10 may then be inserted into the socket cup 22, where the compression is released and the protrusion 18 is received by the channel 26. The ring lip 16 may include machined grooves to allow for loose tightening of the support ring 10. When the support ring 10 is received by the socket cup 22 of the connection socket 24, the protrusion 18 may be received by the channel 26. The ring lip 16 is configured to be positioned flush with the outer lip 58 of the socket cup 22. The second end 12b of the body 12 of the support ring 10 may be configured to be positioned proximate the sealing recess 54. However, it is contemplated that the length of the body 12 of the support ring 10 and the position of the protrusion 18 on the body 12 may be selected to position the second end 12b within the socket cup 22 downstream of the sealing recess 54.

Figure 3A:
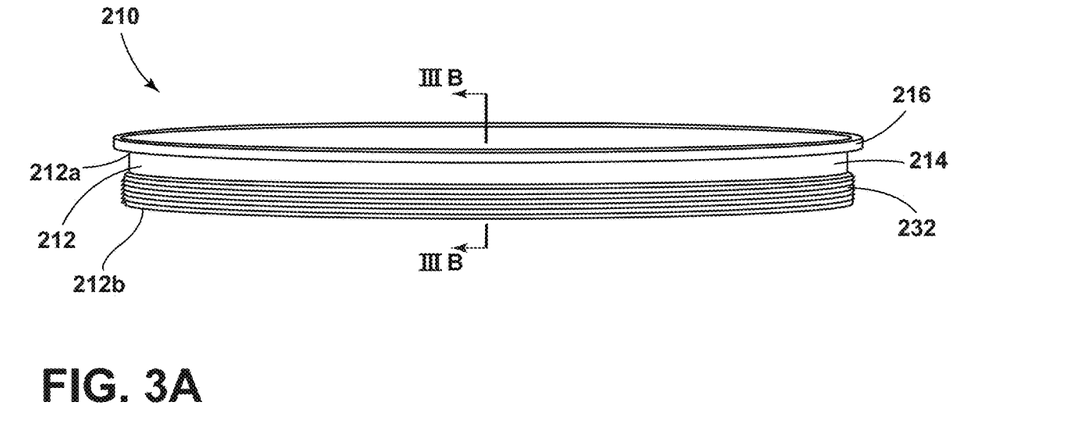
FIG. 3A is a perspective view of a support ring, according to another example.
Figure 3B:
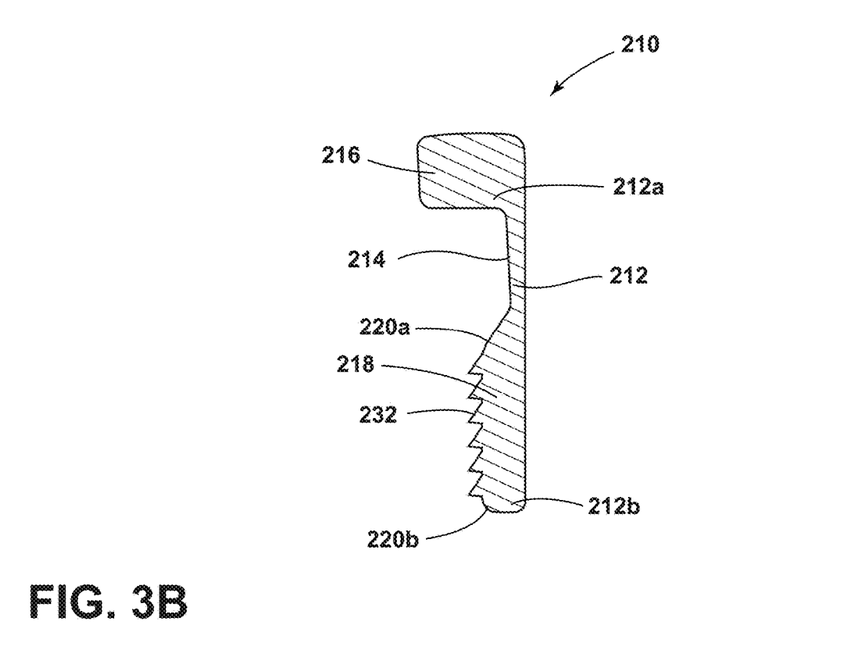
FIG. 3B is a cross-sectional view of the support ring taken along line IIIB-IIIB of FIG. 3A.
Figure 3C:
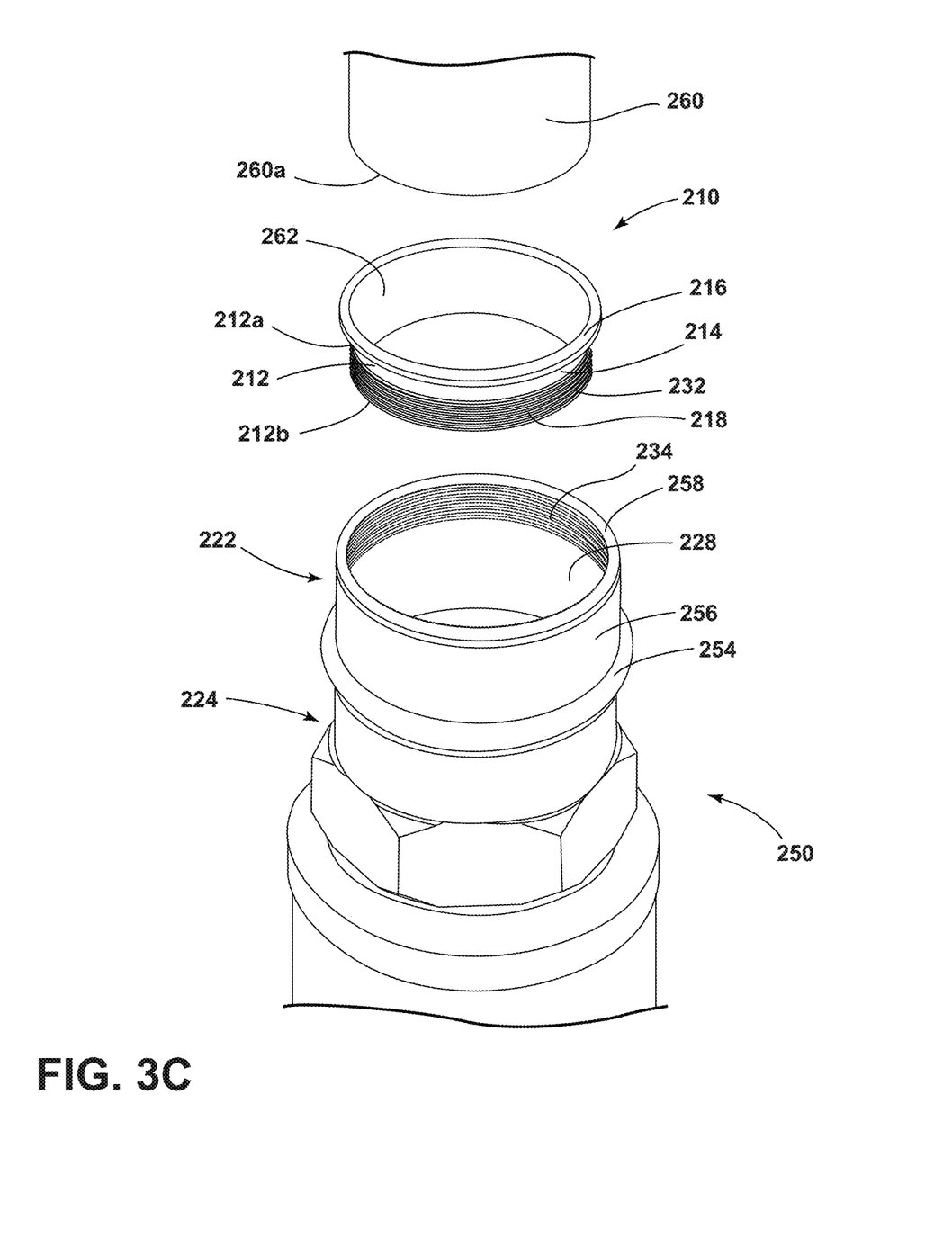
FIG. 3C is an exploded view of a connection socket and piping including the support ring of FIG. 3A.

Referring now to FIGS. 3A-3C, a support ring 210 is depicted that can be employed in a tubular connection 250. The support ring 210 and tubular connection 250 are similar to the support ring 10 and the tubular connection 50 (see FIGS. 1A-1C and 2A-2C), respectively, and like-numbered elements have the same or substantially similar functions and structures. The primary difference between the support rings 10 and 210 and the tubular connections 50 and 250 is that the support ring 210 and tubular connection 250 include threading. In particular, the support ring 210 is configured to be received by a socket cup 222 of a connection socket 224 by engagement of the threading. The support ring 210 may be formed of a metal alloy, such as, for example, steel. The alloy is selected based on strength to provide a thin (e.g., low in thickness) support ring 210 that provides reinforcement of the tubular connection 250 to prevent fracture from hoop stress, as discussed in more detail below.

Figure 7:
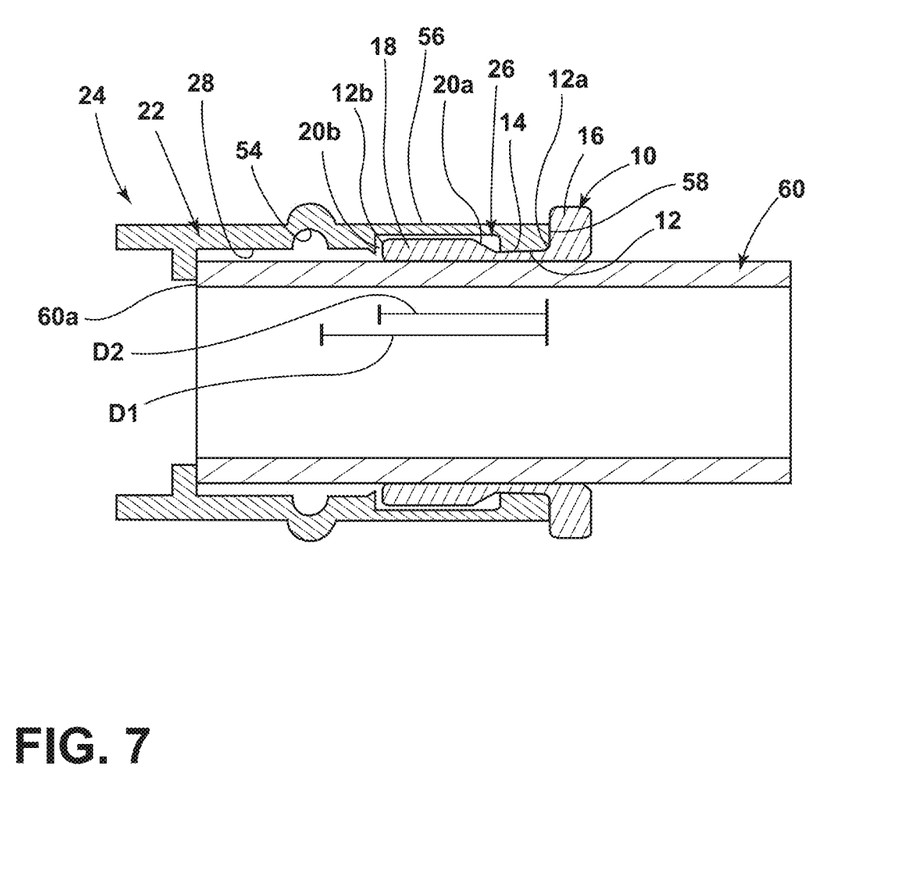
FIG. 7 is a cross-sectional view of the connection socket, support ring, and piping of FIG. 6 taken at line VII-VII.

The support ring 210 includes a body 212 having a first end 212a, a second end 212b, and an outer surface 214. A ring lip 216 extends outwardly from the first end 212a of the body 212. In the illustrated embodiment, the outer surface 214 of the support ring 210 includes a protrusion 218. The protrusion 218 is of a predetermined axial height, where the axial height is measured along the body 212 from a top surface 220a of the protrusion 218 to a bottom surface 220b of the protrusion 218. The predetermined axial height may be any axial height permitted by a first distance measured between the first end 212a of the body 212 and the second end 212b of the body 212. The first distance between the first end 212a and the second end 212b may be limited by the design of the connection socket 224. The first distance cannot be greater than a second distance measured from an outer lip 258 of the socket cup 222 of the connection socket 224 to a sealing recess 254 of the socket cup 222. In other words, the outer lip 258 of the socket cup 222 of the connection socket 224 is a first minimum distance D1 from the sealing recess 254 of the socket cup 222 of the connection socket 224, the first end 212a of the body 212 of the support ring 210 is a second minimum distance D2 from the second end 212b of the body 212 of the support ring 210, and the first minimum distance D1 is greater than the second minimum distance D2, as illustrated in FIG. 7.

Still referring to FIGS. 3A-3C, as discussed above, the protrusion 218 includes the top surface 220a and a bottom surface 220b. The top surface 220a may be angled relative to the body 212 of the support ring 210 (FIG. 3B). However, it is contemplated that the top surface 220a and/or bottom surface 220b may extend perpendicularly to the body 212 without departing from the scope of the present disclosure. The protrusion 218 further includes exterior threading 232 configured to mate with interior threading 234 formed on an inner surface 228 of the socket cup 222. The interior threading 234 may be machined into the inner surface 228 of the socket cup 222. When the exterior threading 232 is mated with the interior threading 234, the ring lip 216 sits flush with the outer lip 258 of the socket cup 222. In various examples, the ring lip 216 may include machined grooves to allow for loose tightening of the support ring 210.

Figure 4:
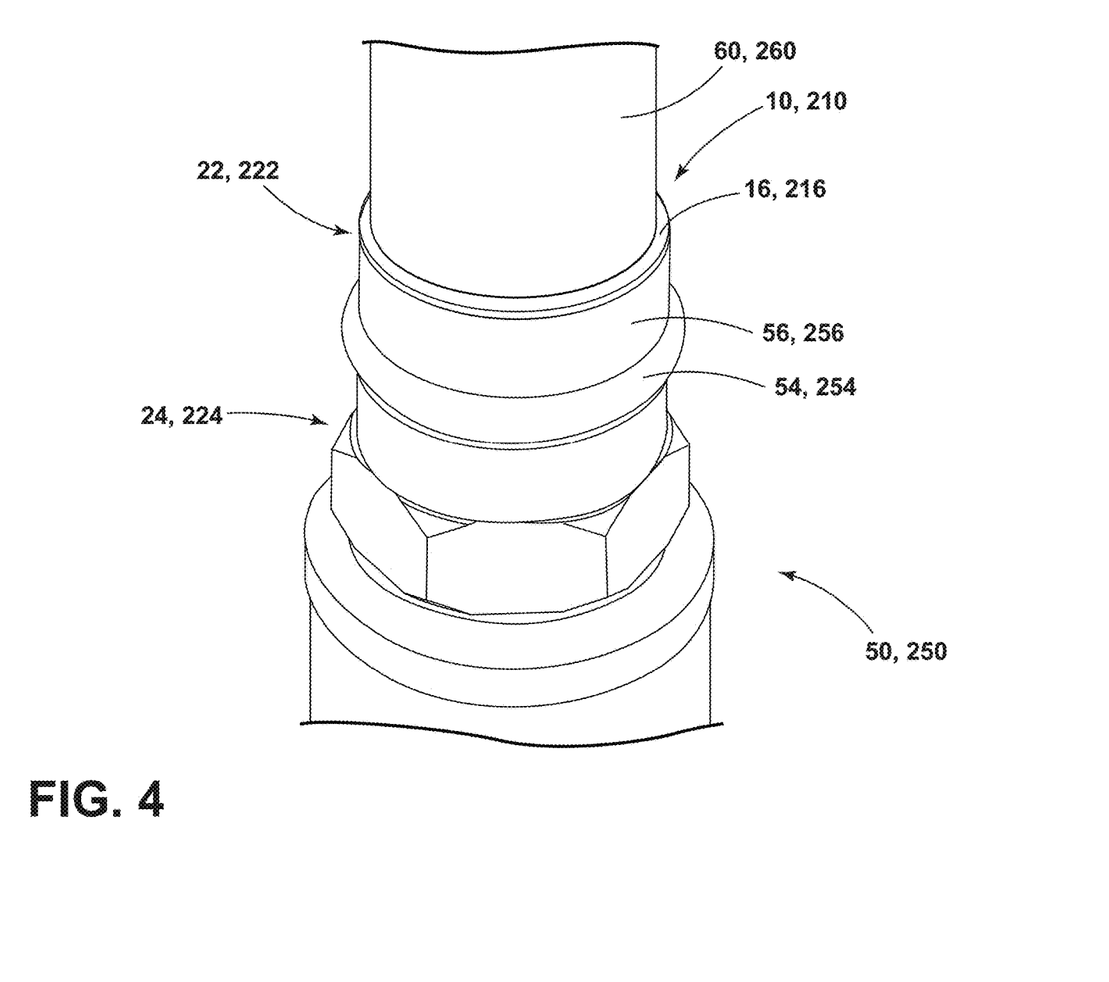
FIG. 4 is a perspective view of a connection socket with any of the various embodiments of the support ring and piping.

Referring now to FIG. 4, the support ring 10, 210 and the tubular connection 50, 250 are depicted with a pipe 60, 260 inserted through the support ring 10, 210 and through the socket cup 22, 222 (see also FIGS. 1A-1C, 2A-2C, and 3A-3C). The tubular connection 50, 250 includes the connection socket 24, 224. In some embodiments, the socket cup 22, 222 of the connection socket 24, 224, may be fabricated from a metal alloy composition. When the pipe 60, 260 is received by the socket cup 22, 222, an inner surface 62, 262 of the support ring 10, 210 may be substantially flush with the pipe 60, 260.

The connection socket 24, 224, as employed by the tubular press connection 50, 250, may be configured to facilitate the joining of one or more pipes 60, 260 to enable the transfer of a fluid (e.g., gas and/or liquids) between the pipes 60, 260 without leakage. In other words, the tubular press connection 50, 250 may be a press connection for piping configured to convey a flowing medium. Further, the connection socket 24, 224 may be sealed and used to terminate or otherwise cap a pipe 60, 260. Still further, those with ordinary skill in the art can appreciate that the connection socket 24, 224 may be configured as a valve with the features outlined with regard to the socket 24, 224 (e.g., with the sealing recess 54, 254, the support ring 10, 210, etc.).

The socket cup 22, 222 may include the sealing recess 54, 254. In some aspects, the sealing recesses 54, 254 has a substantially semi-circular, rectangular, square or triangular cross-section. The sealing recess 54, 254 may house an O-ring to facilitate sealing of the connection. It will be understood that the socket cup 22, 222 may include more than one sealing recesses 54, 254 without departing from the scope of the present disclosure. For example, the socket cup 22, 222 may include primary and secondary sealing recesses having substantially the same cross-sectional diameter, widths or comparable dimension, or, may include primary and secondary sealing recesses having differing cross-sectional diameters, widths or comparable dimensions. It will be further understood that there may be tertiary, quaternary, etc. sealing recesses without departing from the scope of the present disclosure.

The connection socket 24, 224, as employed by the tubular connection 50, 250, may be configured to facilitate the joining of one or more pipes 60, 260 to enable the transfer of a fluid (e.g., gas and/or liquids) between the pipes 60, 260 without leakage. Further, the connection socket 24, 224 may be sealed and used to terminate or otherwise cap the pipe 60, 260. The pipe 60, 260 may further include a first pipe end 60a, 260a (see FIGS., 1C, 2C, and 3C) that may be in contact with the sealing recess 54, 254.

Figure 5:
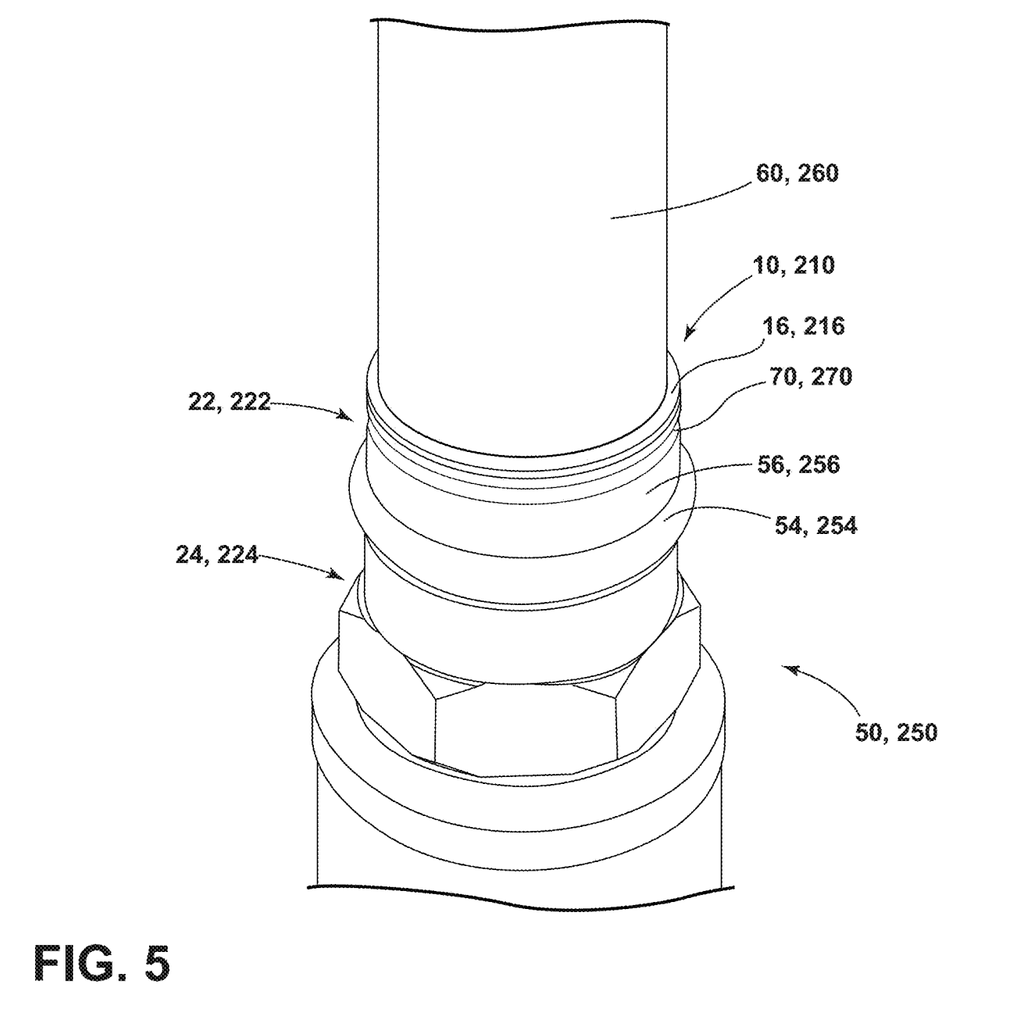
FIG. 5 is a perspective view of the connection socket of FIG. 4 where the connection socket has been pressed.
Figure 6:
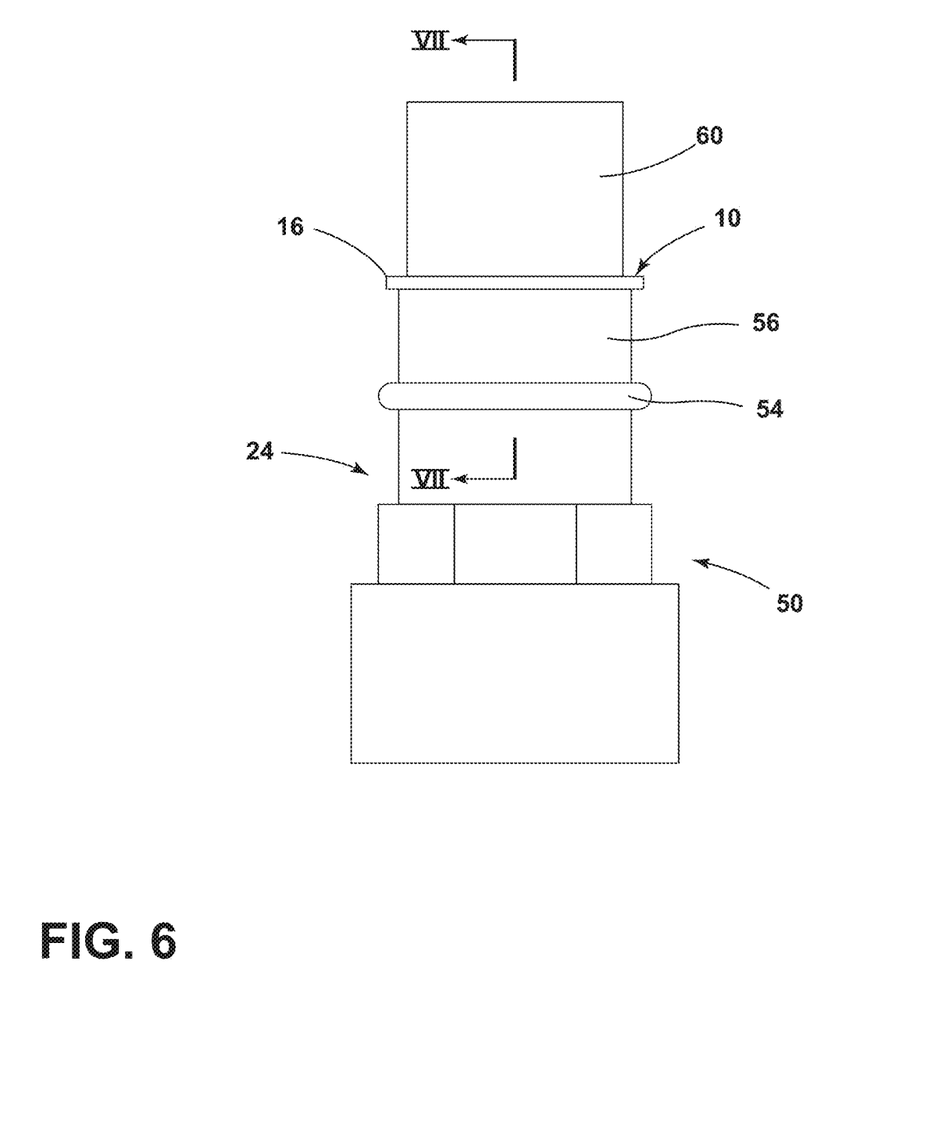
FIG. 6 is a front elevational view of a connection socket with any of the various embodiments of the support ring and piping.

Referring now to FIG. 5, the tubular connection 50, 250 is pressed using a "clam-shell" press jaw (not shown) (see also FIGS. 1A-1C, 2A-2C, and 3A-3C). When the press jaw is closed about the outer wall 56, 256 tubular connection 50, 250 along a line shown by the press indention 70, 270, force is applied unevenly and, without the benefit of the support ring 10, 210, stress to and deformation of the tubular connection 50, 250 may be caused at the final point of tool closure. This pressing force also provides the press indention 70, 270, as shown in FIG. 5. The uneven distribution of the pressing force might otherwise result in the failure of the connection socket 24, 224 without the provision of the support ring 10, 210. Additionally, the support ring 10, 210 may provide protection against pressure from exposure of the tubular connection 50, 250 to application driven-stresses (e.g., the flow of gaseous medium). Without the provision of the support ring 10, 210, the pressure may result in excessive "hoop stress" and might also lead to slippage of the connection components. Nevertheless, the support ring 10, 210 provides resistance to hoop stress by reinforcing against and distributing the uneven force, preventing fracturing of the connection socket 24, 224 upon use. The resistance to fracturing may also prevent deformation of the connection socket 24, 224 during pressing, such as a distorted crimped end, which may prevent leakage of the medium being transported by the pipe 60, 260. Where a portion of the socket 24, 224 is crimped from the use of the clam-shell press jaw, the hoop stress may create a fracture along the crimped end. The support ring 10, 210 may provide added support to prevent such fractures.

Referring now to FIGS. 1A-5, the support ring 10, 210 may also provide resistance to slippage induced by high pressure from the medium being transported through the pipe 60, 260 by virtue of the protrusion 18, 218 on the body 12, 212. When the high-pressure medium is transported through the pipe 60, 260, axial force and resultant axial stress develop along the plane of the pipe 60, 260 and, without the benefit of the support ring 10, 210, the axial stress might otherwise lead to slippage. An exemplary configuration of the support ring 10 (FIGS. 1A-1C and 2A-2C) provides resistance to slippage by gripping with the protrusion 18 received in the channel 26. In another exemplary configuration, the support ring 210 (FIGS. 3A-3C) provides resistance to slippage by gripping with the threading 232, 234 to prevent separation. After the tubular connection 50, 250 is pressed, the support ring 10, 210 may also continue to prevent leakage from the sealing recess 54, 254 and the socket cup 22, 222. Referring to the support ring 10, 210, it will also be understood that a ring inner surface 62, 262 of the body 12, 212 of the support ring 10, 210 may be altered to increase drag against the inserted pipe 60, 260. These alterations may include, for example, knurling, light threading, machined bars, or any combination thereof.

The resistance to slippage offered by the support ring 10, 210 may be directly related to the protrusion 18, 218. Where the protrusion 18 of the support ring 210 is a non-threaded protrusion 18, such as in FIGS. 1A-1C and 2A-2C, the protrusion 18 may be received by the channel 26 to form a grip for the support ring 10 on the socket cup 22. Further, where the protrusion 218 includes the exterior threading 232, such as in FIGS. 3A-3C, the mating of the exterior threading 232 and the interior threading 234 on the inner surface 228 of the socket cup 222 may form a grip for the support ring 210 on the socket cup 222. Additionally, the body 12, 212 of the support ring 10, 210 may be of a length to allow the second end 12b, 212b to protrude beyond the press indention 70, 270. This may reinforce the connection socket 24 or 224 closer to the sealing recess 54 or 254. However, as previously discussed elsewhere herein, the support ring 10 or 210 may be shorter so that the second end 12b, 212b of the body 12, 212 is positioned directly below the press indention 70, 270. This may provide improved slip resistance against the axial force.

Referring back to FIG. 5 and as previously discussed elsewhere herein, the ring lip 16, 216 of the support ring 10, 210 may be configured to sit flush with the outer lip 58, 258 of the socket cup 22, 222. Where a support ring 10 having a split 30 is used, such as in FIGS. 1A-2C, the flush contact between the ring lip 16, 216 and the outer lip 58, 258 may provide a visual check for the compression of the press joint at the press indention 70. If the split 30 is not sufficiently closed after pressing, the remaining split may indicate that the socket cup 22 was not adequately forced into the pipe 60 by the pressing force. Further, the contact may allow for a second press shortly following the first, preventing failure of the connection due to an inadequate press. Additionally, any time that the support ring 10 with the split 30 is used, the positioning of the ring lip 16 substantially flush with the outer lip 58 of the socket cup 22 may ensure that additional length is not present to prevent a clean close of the split.

According to a first aspect, a support ring for a tubular connection may be provided that comprises a body comprising a first end and a second end. A circumferential ring lip may be positioned proximate to, and extend substantially perpendicular from, the first end of the body. A protrusion may be positioned on the body between the first end and the second end. The protrusion may comprise a top surface and a bottom surface.

According to a second aspect, the support ring according to the first aspect may be provided, wherein the top surface of the protrusion may be angled relative to the body.

According to a third aspect, the support ring according to the first or second aspect may be provided, wherein the bottom surface of the protrusion may be aligned with the second end of the body and the top surface of the protrusion may be positioned between the first end of the body and the second end of the body.

According to a fourth aspect, the support ring according to one of the first through third aspects may be provided, wherein the protrusion may comprise a protrusion threading configured to mate with a socket threading within a connection socket.

According to a fifth aspect, the support ring according to one of the first through fourth aspects may be provided, wherein the support ring may further comprise a compressible split extending from the first end of the body to the second end of the body.

According to a sixth aspect, a support ring for a tubular connection may be provided that comprises a body comprising an outer surface, a first end, and a second end. A protrusion may be axially positioned on the body. The protrusion may comprise a top surface and a bottom surface and may extend circumferentially from the body. A circumferential ring lip may extend from the first end of the body.

According to a seventh aspect, the support ring according to the sixth aspect may be provided, wherein the protrusion may be axially spaced from the first end of the body and the second end of the body.

According to an eighth aspect, the support ring according to the sixth or seventh aspect may be provided, wherein the support ring may further comprise a compressible split extending from the first end of the body to the second end of the body.

According to a ninth aspect, the support ring according to one of the sixth through the eighth aspects may be provided, wherein an inner surface of the body may be configured to increase drag against a pipe.

According to a tenth aspect, the support ring according to one of the sixth through the ninth aspects may be provided, wherein the top surface and the bottom surface of the protrusion may be substantially perpendicular relative to the body of the support ring.

According to an eleventh aspect, a tubular connection may be provided that comprises a connection socket comprising an outer lip and a socket cup. A pipe may comprise a pipe end. The pipe end may be in contact with the socket cup. A support ring may be positioned about the pipe and may be operably coupled to the connection socket. The support ring may comprise a body having an outer surface, a first end, and a second end. A ring lip may extend from the first end of the body and may be positioned flush with the outer lip of the connection socket. A protrusion may have a top surface and a bottom surface. The protrusion may be positioned on the body of the support ring.

According to a twelfth aspect, the tubular connection according to the eleventh aspect may be provided, wherein the connection socket may comprise a sealing recess. The second end of the body of the support ring may be positioned in contact with the sealing recess.

According to a thirteenth aspect, the tubular connection according to the eleventh or twelfth aspect may be provided, wherein the protrusion of the support ring may comprise a protrusion threading that may be mated with a socket threading of the socket cup.

According to a fourteenth aspect, the tubular connection according to one of the eleventh through the thirteenth aspects may be provided, wherein the socket cup may comprise an inner surface. The inner surface defines a channel.

According to a fifteenth aspect, the tubular connection according to the fourteenth aspect may be provided, wherein the channel may be in contact with the protrusion.

According to a sixteenth aspect, the tubular connection according to one of the eleventh through the fifteenth aspects may be provided, wherein the support ring may define a compressible split extending from the first end of the body to the second end of the body.

According to a seventeenth aspect, the tubular connection according to one of the eleventh through the sixteenth aspects may be provided, wherein the second end of the body may be positioned beneath a pressing point on the connection socket.

According to an eighteenth aspect, the tubular connection according to one of the eleventh through the seventeenth aspects may be provided, wherein the top surface of the protrusion may be angled relative to the body.

According to a nineteenth aspect, the tubular connection according to one of the eleventh through the eighteenth aspects may be provided, wherein the bottom surface of the protrusion may be aligned with the second end of the body and the top surface of the protrusion may be positioned between the first end of the body and the second end of the body.

According to a twentieth aspect, the tubular connection according to one of the eleventh through the nineteenth aspects may be provided, wherein the protrusion may be axially spaced from the first end of the body and the second end of the body.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents.

What is claimed is:

1. A tubular connection, comprising:
   a connection socket comprising a single unitary body that includes an outer lip, a socket cup, a sealing recess, and a channel;
   a pipe comprising a pipe end directly in contact with the socket cup; and
   a support ring positioned about the pipe and operably coupled to the connection socket, wherein the support ring comprises:
   a body having an outer surface, a first end, and a second end;
   a ring lip extending from the first end of the body and positioned substantially flush with the outer lip of the connection socket;
   a protrusion having a top surface and a bottom surface, wherein the protrusion is positioned on the body of the support ring, such that the bottom surface of the protrusion is aligned with the second end of the body and the top surface of the protrusion is positioned between the first end of the body and the second end of the body, said protrusion being received in said channel of said connection socket; and
   wherein the outer lip of the connection socket is a first minimum distance from the sealing recess of the connection socket, the first end of the support ring body is a second minimum distance from the second end of the support ring body, and the first minimum distance is greater than the second minimum distance.

2. The tubular connection of claim 1, wherein the protrusion of the support ring comprises a protrusion threading that is mated with a socket threading of the socket cup.

3. The tubular connection of claim 1, wherein the socket cup comprises an inner surface, and further wherein the inner surface defines the channel.

4. The tubular connection of claim 3, wherein the channel is in contact with the protrusion.

5. The tubular connection of claim 3, wherein the inner surface of the socket cup is configured to increase drag on the pipe.

6. The tubular connection of claim 1, wherein the support ring defines a compressible split extending from the first end of the body to the second end of the body.

7. The tubular connection of claim 1, wherein the second end of the body is positioned beneath a pressing point on the connection socket.

8. The tubular connection of claim 1, wherein the top surface of the protrusion is angled relative to the body.

9. The tubular connection of claim 1, wherein the top surface and the bottom surface of the protrusion are substantially perpendicular relative to the body of the support ring.

\* \* \* \* \*